(12) United States Patent
Kuschke

(10) Patent No.: US 8,473,656 B2
(45) Date of Patent: Jun. 25, 2013

(54) METHOD AND SYSTEM FOR SELECTING A COMMUNICATIONS BUS SYSTEM AS A FUNCTION OF AN OPERATING MODE

(75) Inventor: Detlev Kuschke, Schieder-Schwalenberg (DE)

(73) Assignee: Phoenix Contact GmbH & Co. KG (DE)

( * ) Notice: Subject to any disclaimer, the term of this patent is extended or adjusted under 35 U.S.C. 154(b) by 440 days.

(21) Appl. No.: 12/568,859

(22) Filed: Sep. 29, 2009

(65) Prior Publication Data

US 2010/0088442 A1 Apr. 8, 2010

(30) Foreign Application Priority Data

Oct. 6, 2008 (DE) .......................... 10 2008 050 102

(51) Int. Cl.
*G06F 13/00* (2006.01)
*G06F 13/364* (2006.01)

(52) U.S. Cl.
CPC .................................... *G06F 13/364* (2013.01)
USPC ............................................................ 710/110

(58) Field of Classification Search
USPC ............... 710/104–119, 300–315, 8–19, 1–2; 709/208–211, 234, 248, 251, 253
See application file for complete search history.

(56) References Cited

U.S. PATENT DOCUMENTS

| | | | | |
|---|---|---|---|---|
| 4,748,560 A * | 5/1988 | Kataoka | ......................... | 710/107 |
| 5,793,993 A * | 8/1998 | Broedner et al. | ............. | 710/106 |
| 6,907,331 B2 * | 6/2005 | Paquet | ............................ | 701/36 |
| 6,934,785 B2 * | 8/2005 | Lee et al. | ....................... | 710/300 |
| 7,380,042 B2 * | 5/2008 | Wang et al. | .................... | 710/305 |
| 7,523,239 B2 * | 4/2009 | Shimizu | ......................... | 710/110 |
| 7,603,501 B2 * | 10/2009 | Hsieh et al. | .................... | 710/110 |
| 7,747,804 B2 * | 6/2010 | Wang | ............................. | 710/110 |
| 2006/0259672 A1 * | 11/2006 | Backman | ....................... | 710/110 |
| 2007/0268973 A1 * | 11/2007 | Fanson | .......................... | 375/257 |
| 2007/0269014 A1 * | 11/2007 | Safai et al. | ..................... | 378/143 |
| 2007/0286199 A1 * | 12/2007 | Coteus et al. | .................. | 370/394 |
| 2009/0083463 A1 * | 3/2009 | Aue | ................................ | 710/105 |
| 2010/0082861 A1 * | 4/2010 | Barbara et al. | ................ | 710/106 |
| 2011/0060934 A1 * | 3/2011 | Oh | ................................. | 713/401 |

FOREIGN PATENT DOCUMENTS

| | | |
|---|---|---|
| DE | 197 56 564 A1 | 6/1998 |
| DE | 19714761 A1 | 10/1998 |
| DE | 10 2007 044 816 B3 | 4/2009 |
| EP | 0732654 A1 | 9/1996 |
| EP | 1193916 A2 | 4/2002 |

OTHER PUBLICATIONS

German Patent Office, German Office Action, dated May 8, 2009, Hauber, Germany.
Jordan, et al, "A Fibre Optically Extended Field Bus", "Meas. Sci. Technology", May 6, 1992, pp. 902-908, vol. 3, Publisher: IOP Publishing Ltd., Published in: UK.
De Felice, M., "EP Application No. 09 01 2189 Search Report", Dec. 21, 2009, Publisher: EPO, Published in: EP.

* cited by examiner

*Primary Examiner* — Raymond Phan
(74) *Attorney, Agent, or Firm* — Kaplan Breyer Schwarz & Ottesen, LLP

(57) ABSTRACT

The invention relates to a communications entity for communications via a bus-oriented communications network with a control device (101) that is constructed to communicate via the communications network in response to a selection signal according to a first communications bus sub-system or according to a second communications bus sub-system, and a selection device (103) for generating the selection signal as a function of an operating mode of the communications entity, in order to select the first communications bus sub-system or the second communications bus sub-system.

9 Claims, 5 Drawing Sheets

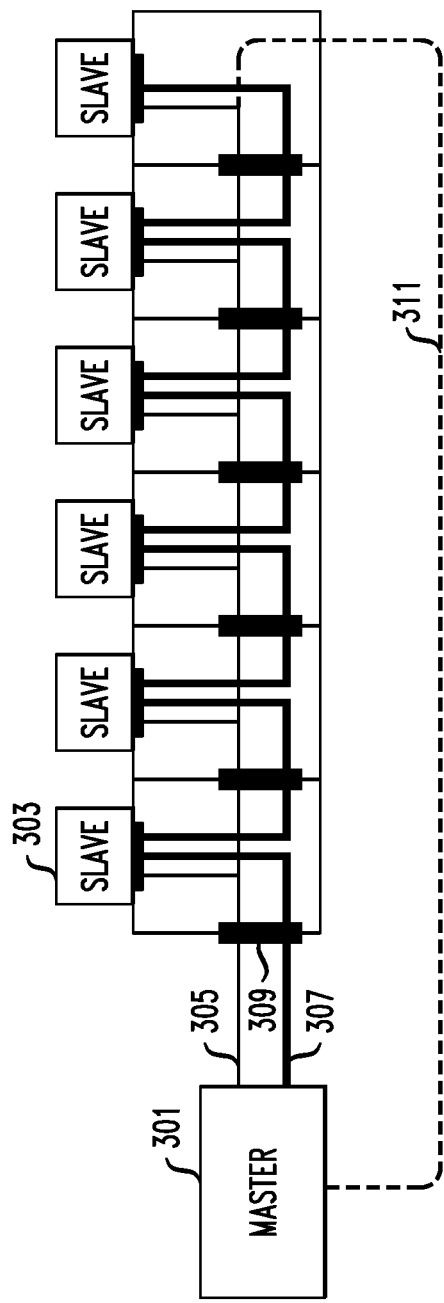

METHOD AND SYSTEM FOR SELECTING A COMMUNICATIONS BUS SYSTEM AS A FUNCTION OF AN OPERATING MODE

FIELD OF INVENTION

The present invention relates to bus-oriented communications networks.

BACKGROUND OF THE INVENTION

In bus-oriented communications networks that are used, for example, in automation systems, it is often necessary to remove or add subscribing communications entities without affecting the remaining communications entities during a running communications operation, which is designated by the term "hot swapping."

For this purpose, for example, field bus systems such as the Profibus or the CAN bus (CAN: Controller Area Network) can be used according to a multi-drop bus system or a multi-drop bus arrangement or topology that is configured, for example, according to the RS 485 standard. Here, the communications bus users are connected in parallel by means of a common communications line, e.g., by means of stub lines or node branches coupled in series with this communications line for the individual bus users. Other field bus systems such as, for example, the SERCOS bus system, are based on a point-to-point system or a point-to-point bus arrangement with interconnected point-to-point connections arranged in the form of a ring. For realizing the redundancy property, here a second ring is often provided, so that a double ring must be realized.

However, both bus arrangements or bus systems have disadvantages. For example, the performance of the multi-drop communications buses is greatly limited by inadequate performance-matching possibilities of the communications network. In addition, in the case of a multi-drop communications connection, selective bus user addressing is required in which each bus user performed an address setting. On the other hand, in the case of an additional design in the form of the already mentioned double ring, a concatenation of point-to-point connections can often compensate only a single interruption in the communications connection. In addition, the known communications bus concepts are not flexible, because each structure does not take into consideration different operating modes of the communications system that could be, for example, data-specific or service-specific.

The problem, therefore, is to create an efficient and flexible concept for bus-oriented communications.

SUMMARY OF THE INVENTION

The invention is based on the knowledge that an efficient bus communications system can be realized when the communications entities connected to this system can select a suitable communications bus system as a function of an operating mode. This assumes that the communications entities are designed to work according to at least two communications bus systems. Therefore, an overall system that can be used across several sectors is provided that combines, for example, for process applications, the hot-swapping property with quick data transfer for, for example, mechanical and plant engineering.

For realizing quick data transfer with clock rates above 25 MHz, for example, point-to-point oriented communications bus systems such as Profinet, EtherCAT, or SERCOS III can be used. In addition, a sumframe protocol could also be used efficiently for this purpose. Such systems satisfy, in particular, machine and plant-engineering specific requirements with respect to network performance.

The hot-swapping property, that is, for example, the non-reactive pulling or insertion of bus users from, for example, a modular station during a running operation can be provided, for example, by multi-drop systems such as, for example, the field bus or the Profibus PA in which all of the bus users are connected in parallel to a communications section. Despite a possibly reduced transmission rate, such topologies fulfill, in particular, requirements that are typically set in process technology. The properties forming the basis of such communications protocols are preferably message-oriented, so that previously an additional assignment of addresses had to be performed explicitly before a user assumes useful operation, but this can be eliminated according to the invention.

The invention relates to a communications entity for communications by means of a bus-oriented communications network with a control device that is constructed to communicate via the communications network as a response to a selection signal according to a first communications bus sub-system or according to a second communications bus sub-system, and to a selection device for generating the selection signal as a function of an operating mode of the communications entity in order to select the first communications bus sub-system or the second communications bus sub-system.

According to one embodiment, the first communications sub-system forms a point-to-point system and the second communications sub-system forms a multi-drop system within the bus-oriented communications network.

According to one embodiment, the operating mode comprises a first operating mode with operating phases for the configuration and/or addressing of the bus-oriented communications network and/or communications entities that can be connected to this network and/or for the transmission of process data and/or parameter data, and a second operating mode with operating phases for the configuration and/or addressing of the bus-oriented communications network and/or communications entities that can be connected to this network and/or for the transmission of process data and/or parameter data, wherein the selection device is constructed to select, in the first operating mode, preferably the first communications sub-system and, in the second operating mode, preferably the second communications sub-system for the transmission of process data and/or parameter data, in particular, exclusively for the transmission of process data and/or parameter data.

According to one embodiment, the selection device is constructed to select the first communications sub-system in the noise-free first operating mode and the second communications sub-system in the noisy first operating mode or vice versa.

According to one embodiment, the communications entity is a master entity or a slave entity.

According to one embodiment, the communications entity comprises a common hardware connection unit for communicating via the first communications sub-system and for communicating via the second communications sub-system.

The invention further relates to a bus communications system with a plurality of communications entities that are designed to communicate via a bus-oriented communications network as disclosed above, wherein one communications entity of the plurality of communications entities is designed as a master entity and wherein the remaining communications entities of the plurality of communications entities are designed as slave entities.

According to one embodiment, the bus communications system comprises a first wiring arrangement for connecting the communications entities according to the first communications sub-system and a second wiring arrangement for connecting the communications entities according to the second communications sub-system.

According to one embodiment, the bus communications system comprises a plurality of coupling elements, in particular, T coupling elements, for the modular coupling of the communications entities according to the first communications sub-system and second communications sub-system.

According to one embodiment, a connection is provided in order to expand the first communications sub-system or the second communications sub-system into a ring communications sub-system.

BRIEF DESCRIPTION OF THE DRAWINGS

Additional embodiments of the present invention will be explained in greater detail with reference to the accompanying drawings. Shown are.

DETAILED DESCRIPTION

Figure 1:
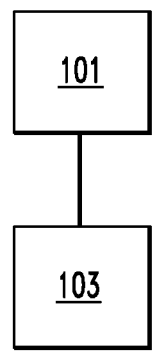
FIG. 1 a communications entity for communications via a bus-oriented communications network, FIG. 2 bus-oriented communications networks according to a first and a second communications bus sub-system, FIG. 3 a bus communications system, FIG. 4 a bus communications system, FIG. 5 based on FIG. 3, a structure of a master, and FIG. 6 based on FIG. 3, a structure of a slave.

FIG. 1 shows a block diagram of a communications entity, for example, of a master or a slave, for communications via a bus-oriented communications network with a control device 101 and a selection device 103. The control device 101 can contain a processor and/or firmware and/or hardware and, e.g., an installed logic circuit. The selection device 103 generates, as a function of an operating mode of the communications entity that can be dependent, for example, on data, service, or noise, a selection signal, in order to select a first or a second communications bus sub-system. These sub-systems are integrated within the bus-oriented communications network and the communications entity, as disclosed below, for the selection. The selection signal is fed to the control device that is designed to respond to this signal, in particular, in the case of a processor device, for example, according to a program, in order to communicate according to the first or the second communications bus sub-system. For this purpose, the communications entity could furthermore have a transmitter and/or a receiver for communications via the communications network that could also be, in principle, wireless or wired.

According to the invention, in the communications entity that could operate, for example, as a master, a bus sub-system with the multi-drop technology could also be integrated in a master assembly in addition to a serial high-speed bus technology for a point-to-point communications sub-system. The overall functionality could be realized, for example, by pre-determined mechanisms or logic circuits that could be implemented both in a communications entity operating as a master and also as a slave. Preferably, the main communications system is realized in the form of a point-to-point connection system, wherein the multi-drop topology could be provided as a secondary system or as a fall-back system. This construction is thus advantageous for fields of application in mechanical and plant engineering.

Alternatively, e.g., if the main communications system is realized in the form of a multi-drop topology for fields of application in process technology for message-oriented data transmissions, then the point-to-point connection system could be provided as a secondary system or as a fall-back system, particularly in the case of continuous interference in the multi-drop topology.

Figure 2A:
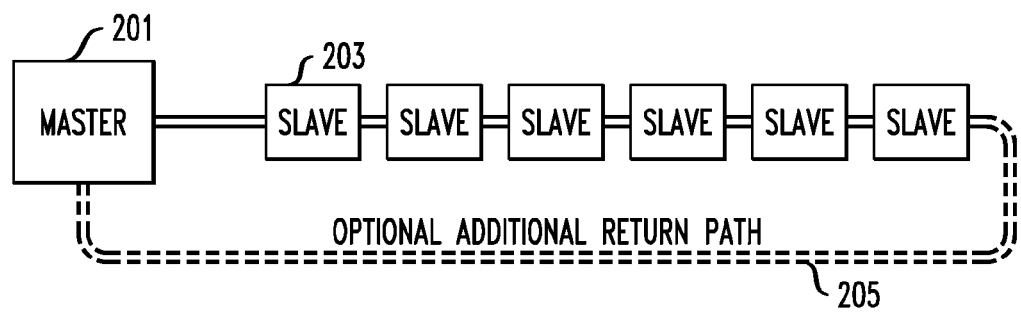

FIG. 2 shows two communications bus topologies that can be realized with the communications entity according to the invention. In FIG. 2a, a series bus topology with one master 201 and a plurality of series-connected slaves 203 is shown as an example. Through the point-to-point connection arrangement and corresponding protocol configuration, it is possible to provide extremely fast data transfer. Optionally, a connection 205 is provided that expands the topology shown in FIG. 2a into a ring topology.

Figure 2B:
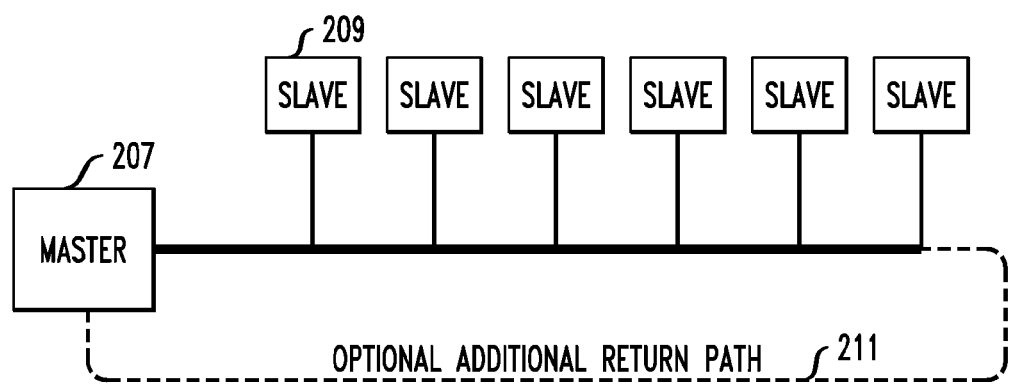

FIG. 2b shows a multi-drop topology with a master 207 and a plurality of slaves 209 that can feature, for example, the features of the communications entity according to the invention. Through the multi-drop topology realized in FIG. 2b and through the corresponding protocol realization, it is possible that each slave 209 could also communicate directly with the master 207 and/or the slaves could also communicate directly with each other. In this way, a connection 211 that expands the topology into a ring topology could optionally be provided.

According to the invention, the communications entities are designed to operate in the context of both topologies shown in FIG. 2. In this way, according to the serial bus sub-system shown in FIG. 2a, a bus system is realized that is provided for a transmission of, for example, process and parameter data and also for the configuration as well as the addressing of the bus system or the entities connected to this system. If communications are to be performed only according to this bus sub-system, then this is also designated below as a first operating mode or as a first operating type or also as operating mode A. This operating mode A essentially fulfills the requirements of machine construction. In contrast, in a second operating mode or a second operating type or an operating mode B, e.g., the bus sub-system shown in FIG. 2b can be used exclusively for a transmission of process and/or parameter data and the bus sub-system shown in FIG. 2a is used only for the configuration and the addressing of the bus system. This operating mode B essentially fulfills the requirements of process engineering.

According to the invention, the response to a combination of the operating modes A and B described above and the corresponding selection and control of the first or second sub-system is also possible. Thus, it is possible, for example, before the appearance of interference, to use the sub-system shown in FIG. 2a during the operating mode A, wherein, after the appearance of interference, the operating mode B can be used with the sub-system shown in FIG. 2b, or vice versa.

Switching between the aforementioned operating types or modes can be performed, for example, by the master, by the appropriate application, or automatically by the other communications entities themselves. In particular, the bus system shown in FIG. 2a could be configured easily and quickly. If the hot-swapping property is required, for example, in the case of a slave bus user, a switch can be made to the multi-drop bus sub-system, which could also be realized, for example, by means of a change in the communications protocol. If the main system becomes functional again, then, for example, a switch can be made again to the operating mode provided for the noise-free case. Thus, according to the invention, a hybrid protocol structure is preferably used that allows the transmission of process data via a parameter channel provided for this purpose.

Furthermore, as shown in FIGS. 2a and 2b, the appropriate additional connection 205 or 211 could be guided in the form, for example, of an additional cable to the end of a modular input-output station, in order to increase the availability of the system in the case of a loss of an electromechanical connection or a cable connection. Thus, even for the loss of a backplane bus in the case of modular systems, uninterrupted communications can be maintained.

FIG. 3 shows a bus communications system in which the sub-systems shown in FIG. 2 are realized for different operating modes. Here, a master 301 and a plurality of slaves 303 are provided that preferably have the features of the communications entity according to the invention. The bus communications system comprises a first wiring arrangement 305 for realizing the multi-drop arrangement shown in FIG. 2b. Furthermore, a wiring arrangement 307 for realizing the point-to-point arrangement shown in FIG. 2a is provided. Both the master 301 and also the slaves 303 each have a plurality of connections that are defined for the appropriate topology and that allow the wiring shown in FIG. 3. Furthermore, coupling elements 309 that allow modular coupling of communications entities could be provided between the slaves. Furthermore, a back connection 311 is optionally provided. The master and each slave preferably has a hardware connection unit, e.g., plug unit, that combines the appropriate connection contacts for the wiring arrangements of the two sub-systems, so that consequently only the overall system is visible from the outside. Thus, the coupling elements also preferably combine, as can be seen from FIG. 6, for each coupling to a neighboring unit or arrangement, those necessary connection contacts for the two sub-systems within a common hardware connection unit, e.g., plug unit.

Figure 4:
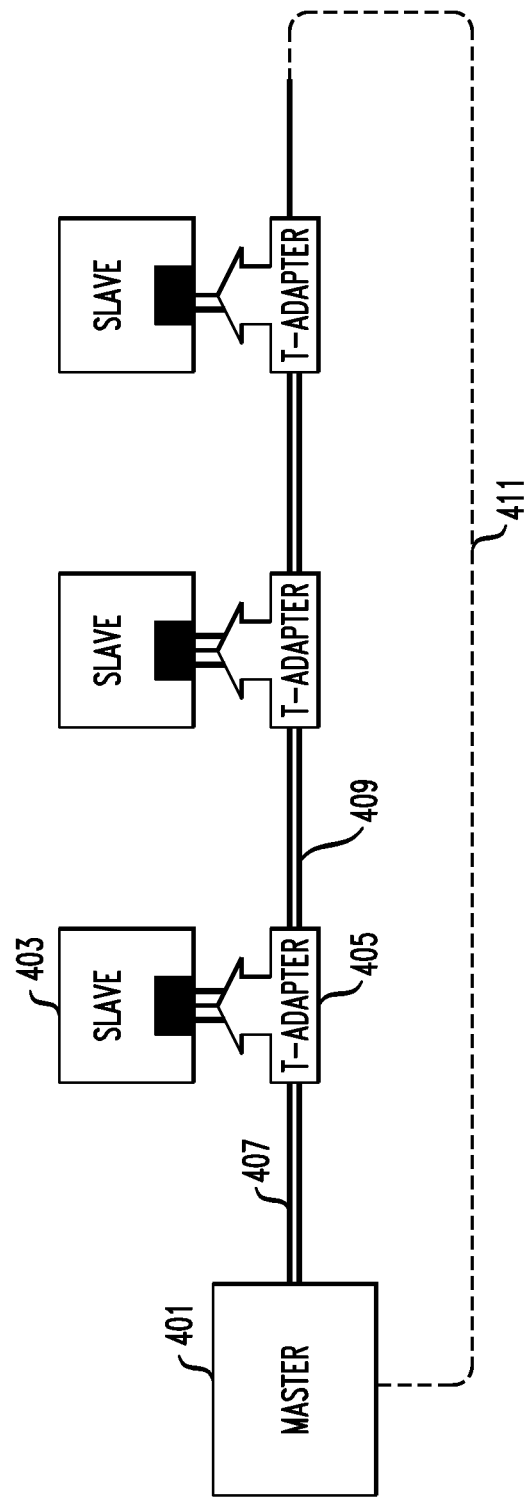

FIG. 4 shows an embodiment of another bus system with a master 401 and a plurality of slaves 403 that can have, for example, the features of the communications entity according to the invention. The communications entities are coupled, for example, to the bus system by means of the T-couplers 405. Here, the bus system comprises a first wiring arrangement 407 for realizing a multi-drop sub-system as well as a wiring arrangement 409 for realizing a point-to-point sub-system. The wiring arrangement 407 could be expanded, for example, by means of an optional back coupling branch 411 into a ring architecture and connected to the master 401. The bus system shown in FIG. 4 is suitable, in particular, for use in remote systems. The master and each slave have, in turn, preferably only one hardware connection unit that combines the appropriate connection contacts for the wiring arrangements of the two sub-systems. A corresponding situation applies to the T-couplers, which preferably each have only one hardware connection unit for each coupling to a neighboring unit or arrangement, wherein this hardware connection unit combines the corresponding connection contacts for the two sub-systems.

Thus, if each hardware connection unit, e.g., plug unit, already preferably combines the appropriate connection contacts for the wiring arrangements of the two sub-systems, then for each coupling between two neighboring units or arrangements, merely two complementary hardware connection units, e.g., a socket-like and a pin-like plug unit, are required.

For the suitable selection of a communications protocol, e.g., a common protocol for the sub-systems shown in FIGS. 3 and 4 can also be used.

Figure 5:
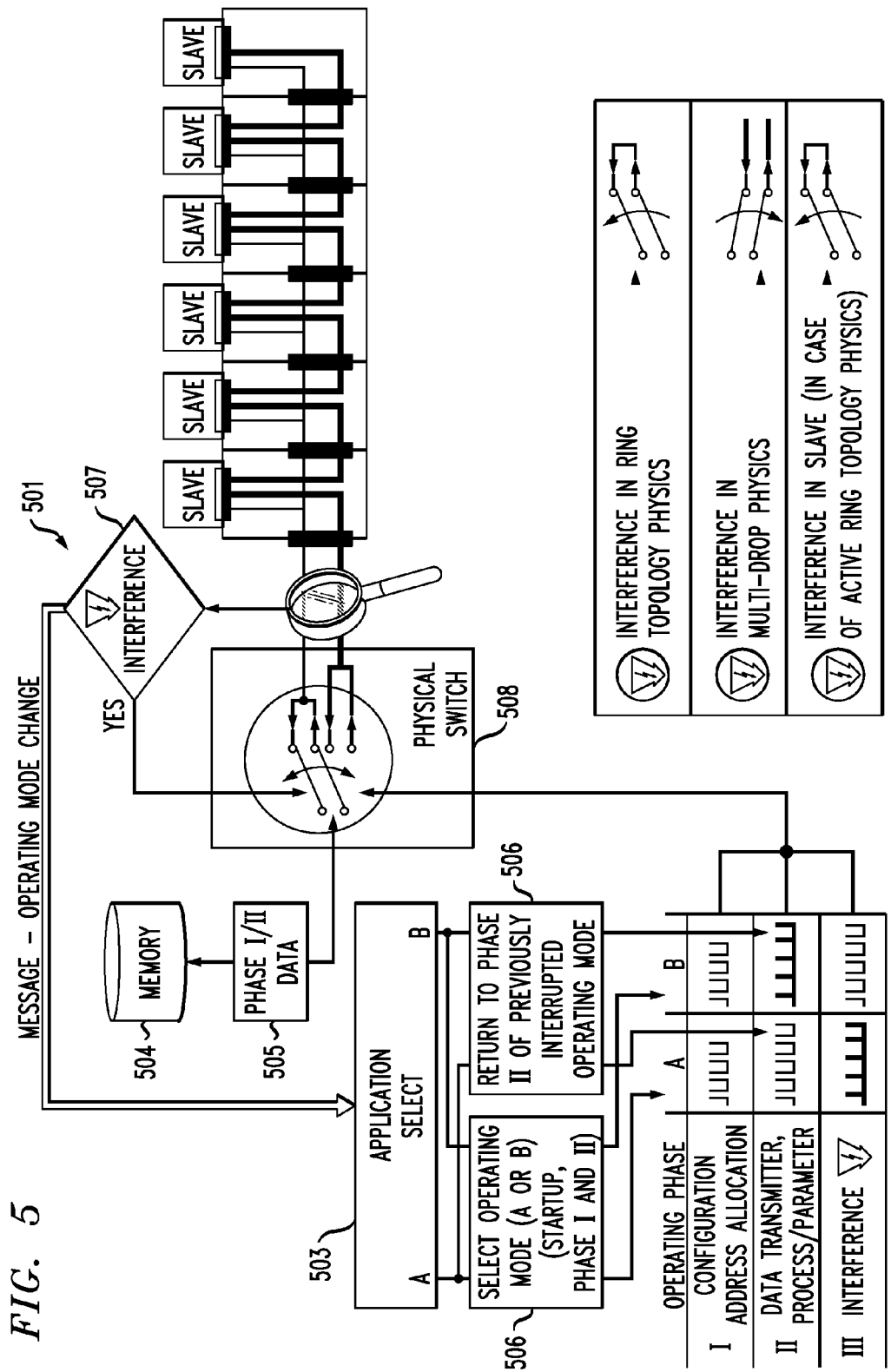

FIG. 5 shows, with reference to the bus topology shown in FIG. 3, a structure of a master 501 that preferably has the features of the communications entity according to the invention. The master 501 comprises a selection device 503 with two outputs A and B that are connected to a control device 505 for the purpose of switching operating modes. The outputs A and B of the selection device 503 are assigned, for example, to the operating modes A and B described above, wherein a selection can be made in each operating mode between a configuration and address assignment and/or a transmission of process data or process parameters. For this purpose, the control device 505 has control sub-devices 506 that allow, furthermore, switching to the operating mode B in the event of interference during the operating mode A, or vice versa. Therefore, it is possible to realize powerful systems that allow, for example, in the hot-swapping case, an emergency strategy.

In detail, a structure of a master with a selection device 503 and a control device 505 is to be seen that causes, in operating mode A or B, startup in phase I or phase II, wherein, in phase II, control reverts to a previously interfered operating mode. Phase III designates an interference state. The master further comprises a memory 504 and also an interference-case detector 507 that informs the selection device 503 of interference. Furthermore, there is a switch 508 for switching between the point-to-point arrangement shown in FIG. 5 (designated in FIG. 5 as ring-topology physics) and the multi-drop arrangement, wherein, in principle, both topologies could also be expanded into a ring topology. As stated above, the connection contacts for both topologies are preferably integrated within a hardware connection unit, e.g., a plug unit. For an interference case in the ring topology physics, for example, a switch is made to the multi-drop arrangement. For an interference case in the multi-drop physics, for example, a switch is made to the ring topology physics. In contrast, for the loss of a slave in the case of active ring topology physics, a switch is made, for example, to the multi-drop topology. The operation change is triggered by the detector 507 that acts on the switch 508. Thus, the master preferably comprises a common hardware connection unit for communicating via the first communications connection arrangement and for communicating via the second communications connection arrangement.

Thus, in the master, the switch 508 also provides for the connection between the data memory 504 and the bus sub-system to be activated for the data transmission. Thus, each switch, whether coming from the point-to-point topology or from the multi-drop topology, can be performed without data loss or while maintaining the consistency of the process instance. Furthermore, in the case of each interference of the active bus sub-system detected by the master, the switch preferably takes place automatically with the simultaneous signaling of the selection device by a notification signal on the performed switch. Consequently, there are essentially no restrictions on further diagnostics and error management.

As an advantage for maintaining the process sequences for the return to a previously selected operating mode due to a recorded interference case, it has been shown that when switching to this operating mode, a new addressing and/or configuration of the bus sub-system or the entities connected to this system no longer have to be performed, but instead can continue with the data transmission in the previously selected operating mode.

Figure 6:
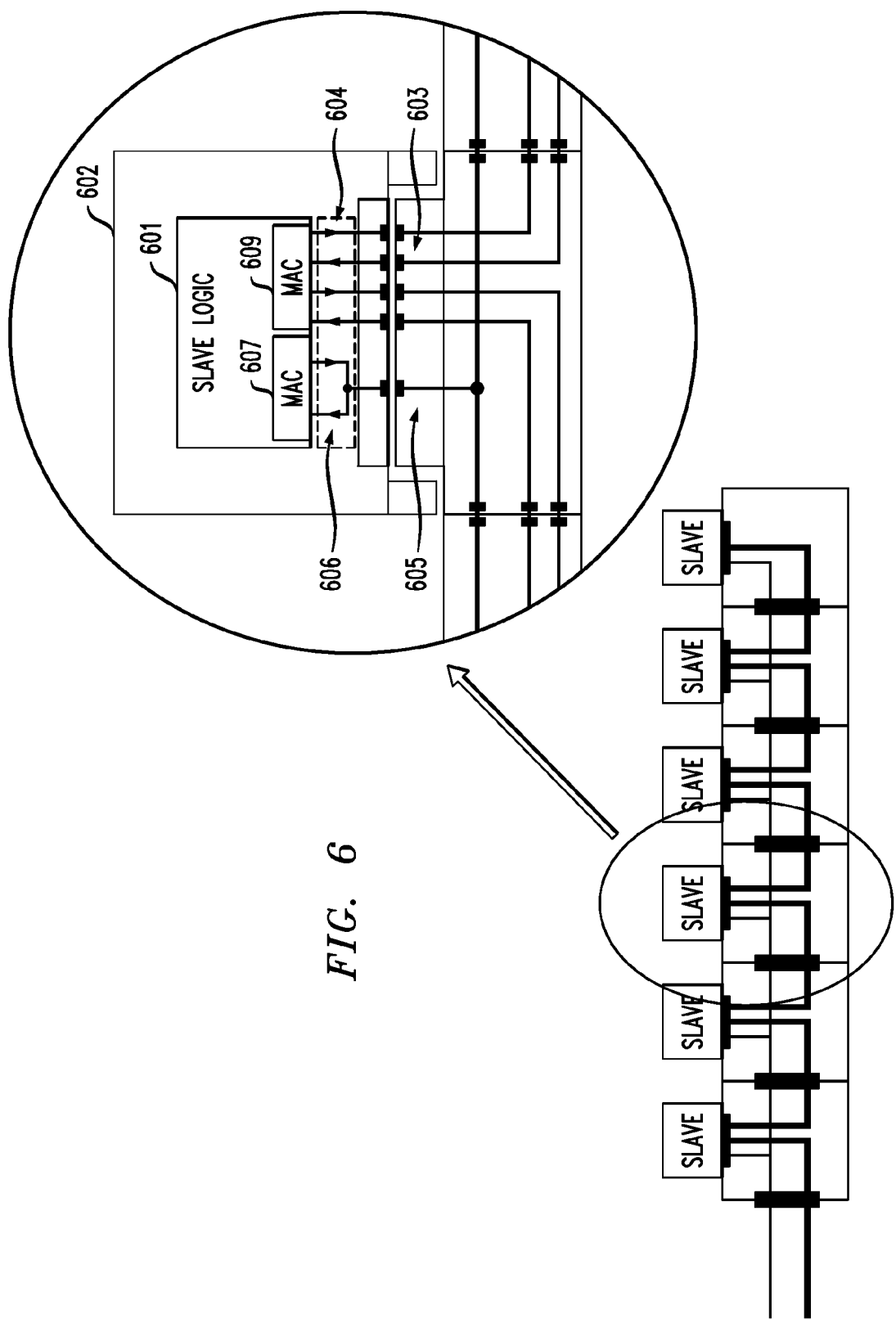

FIG. 6 shows a structure of a slave with slave logic 601 that is arranged in a pluggable housing 602, with different bus topologies that are each assigned to transmission physics 604 or 606, and with MAC elements 609 as well as 607 (MAC: Medium Access Control).

As can be seen from FIG. 6, the pluggable housing 602 comprises a common hardware connection unit for the connection contacts both of the transmission physics 604 and also the transmission physics 606. Likewise, the connection contacts 603 and 605 that are to be coupled with the connection contacts of the transmission physics 604 or with the connection contacts of the transmission physics 606 for connecting the slave to the overall system are integrated within a common hardware connection unit. In the shown example, the hardware connection unit of the pluggable housing 602 is constructed as a socket-like plug unit and the complementary hardware connection unit to be coupled with this plug unit is constructed with the connection contacts 603 and 605 and thus as a pin-like plug unit. Thus, a slave also preferably comprises a common hardware connection unit for communicating via the first communications connection arrangement and via the second communications connection arrangement.

What is claimed is:

1. Communications entity for communications via a bus-oriented communications network, comprising:
    a control device (101) that is constructed to communicate via the bus-oriented communications network in response to a selection signal according to a first communications bus sub-system or according to a second communications bus sub-system; and
    a selection device (103) for generating the selection signal as a function of an operating mode of the communications entity, in order to select the first communications bus sub-system or the second communications bus sub-system;
    wherein the operating mode comprises:
        (i) a first operating mode with operating phases for the configuration and/or addressing of the bus-orientated communications network and/or communications entities that can be connected to the communications network and/or for transmission of process data and/or parameter data, and
        (ii) a second operating mode with operating phase for the configuration and/or addressing of the bus-orientated communications network and/or communications entities that can be connected to the communications network and/or for the transmission of process data and/or parameter data; and
    wherein the selection device is constructed to select, in the first operating mode, the first communications bus sub-system and, in the second operating mode, the second communications bus sub-system for the transmission of process data and/or parameter data.

2. Communications entity according to claim 1, wherein the first communications bus sub-system is a point-to-point system and wherein the second communications bus sub-system is a multi-drop system.

3. Communications entity according to claim 1, wherein the selection device (103) is constructed to select the first communications bus sub-system in a noise-free operating mode and to select the second communications bus sub-system in a noisy operating mode.

4. Communications entity according to claim 1 that is a master entity or a slave entity.

5. Communications entity according to claim 1 further comprising a common hardware connection unit for communicating via the first communications bus sub-system and for communicating via the second communications bus sub-system.

6. Bus communications system comprising a plurality of communications entities of which at least one communications entity is according to claim 1 and that are adapted to communicate via the bus-oriented communications network, wherein one communications entity of the plurality of communications entities is configured as a master entity and wherein the remaining communications entities of the plurality of communications entities are configured as slave entities.

7. Bus communications system according to claim 6 further comprising a first wiring arrangement for connecting the communications entities according to the first communications bus sub-system and a second wiring arrangement for connecting the communications entities according to the second communications bus sub-system.

8. Bus communications system according to claim 6 further comprising a plurality of coupling elements for modular coupling of the communications entities according to the first communications bus sub-system and to the second communications bus sub-system.

9. Bus communications system according to claim 6, wherein a connection is provided in order to expand the first communications bus sub-system or the second communications bus sub-system into a ring communications sub-system.

* * * * *